(No Model.)
P. J. NICOLINI.
DEVICE FOR SULFURING CASKS.
No. 600,926. Patented Mar. 22, 1898.
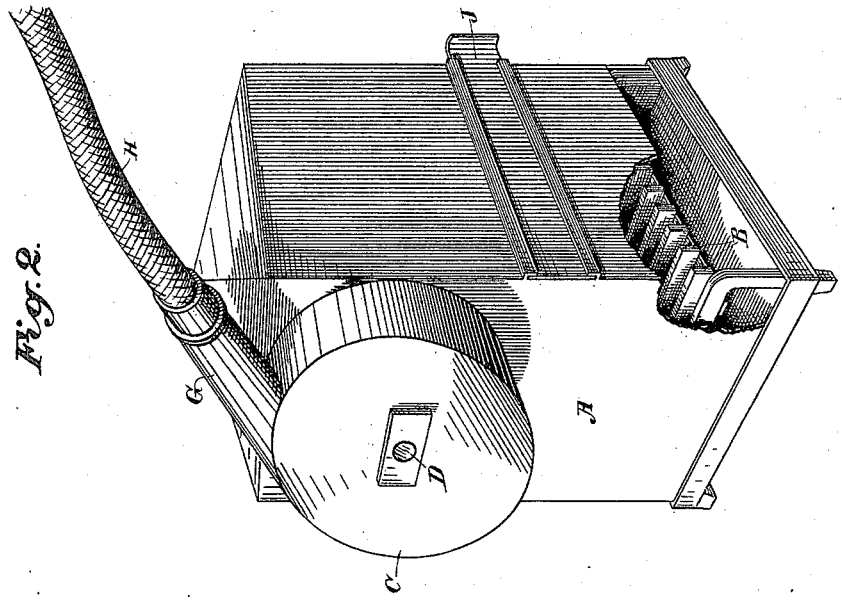
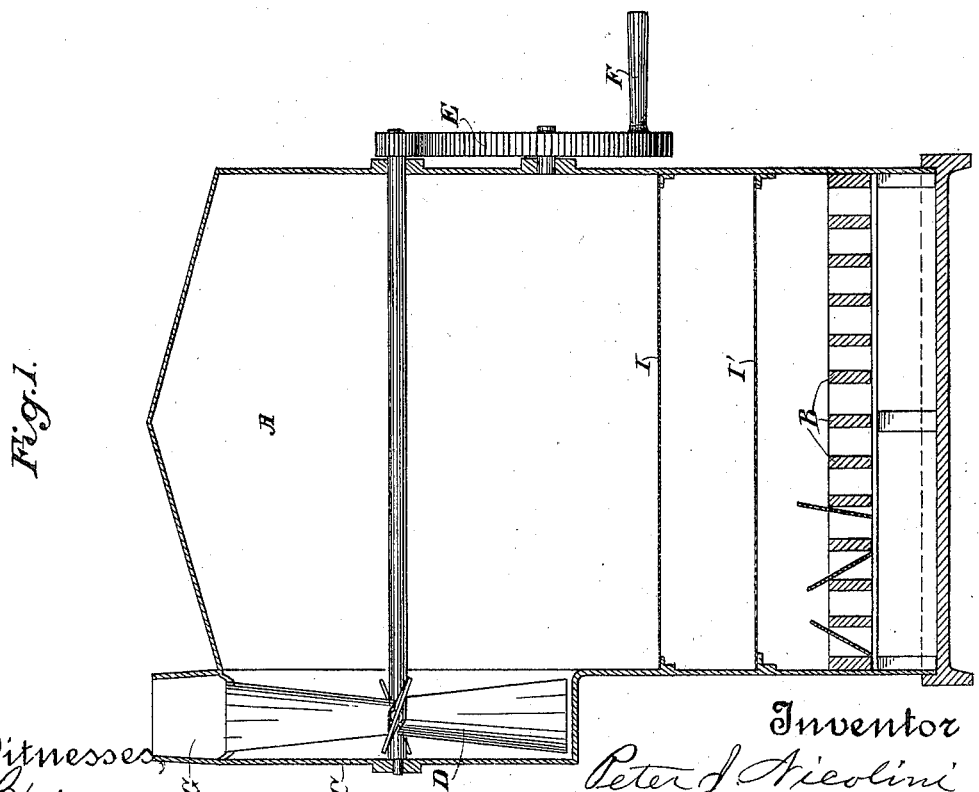
Witnesses
Inventor
Peter J. Nicolini
By Dewey & Co
Attys

United States Patent Office.

PETER J. NICOLINI, OF OAKLAND, CALIFORNIA.

DEVICE FOR SULFURING CASKS.

SPECIFICATION forming part of Letters Patent No. 600,926, dated March 22, 1898.

Application filed June 1, 1897. Renewed February 15, 1898. Serial No. 670,432. (No model.)

*To all whom it may concern:*

Be it known that I, PETER J. NICOLINI, a citizen of the United States, residing at Oakland, county of Alameda, State of California, have invented an Improvement in Devices for Purifying Wine Casks and Conveyers; and I hereby declare the following to be a full, clear, and exact description of the same.

My invention relates to a means for purifying wine casks, hose, and other conveyers which are employed in transferring wine from one receptacle to another and also to prevent the deterioration of the wine within the cask or other receptacle when a portion of the wine has been withdrawn and the upper part of the receptacle contains air.

It consists of the parts and the constructions and combinations of parts which I shall hereinafter describe and claim.

Figure 1 is a vertical section of my apparatus. Fig. 2 is an outside view of the same.

In the fumigation of wine-casks with sulfur it is customary to introduce the sulfur, which is largely in the form of prepared strips with a supporting-wicking, into the bung-hole of the cask after having ignited it, so that in burning it within the cask, if empty, the sulfurous vapors will perform the service for which they are intended, and if the wine has been partially drawn off, leaving air in the upper part of the cask, the burning of the sulfur reduces the oxygen of the air and substitutes sulfurous fumes, which prevents the souring and deterioration of the remainder of the wine. The method of burning the sulfur in this manner is objectionable, since the particles of sulfur, wicking, and ash drop into the wine and produce a deleterious effect upon it.

In my invention I have shown a means for producing and introducing the sulfurous fumes without any danger of foreign substances entering the cask.

In the present case I have shown a furnace-chamber A, of any suitable size, form, and construction, having in the lower part a grate B, formed with parallel vertical bars, between which are introduced strips consisting of flexible or fibrous wicking or other material, which, being supported on edge between the bars, is easily ignited, so as to produce the sulfurous fumes in any desired quantity, depending on the size of the grate and the apparatus used.

Above the grate are situated two screens I I', the lower one having a coarser mesh and the upper one a considerably-finer one. The meshes of these two screens serve to catch and retain any floating particles of the fibrous wicking or ash or other foreign substances which may be carried up by the draft produced by the burning, so that the fumes pass into the upper part of the chamber A free from all foreign substances. At one side of this chamber is fixed a fan-case C, having within it a rotary fan D, which is driven at a high rate of speed by any suitable arrangement of gearing multiplied to the desired extent, as shown at E, and this may be driven either by hand-crank F or by any suitable motor available for the purpose.

The operation of the fan will be to draw the fumes from the casing A and discharge them through the passage G, whence they are conveyed through hose or other suitable conveyers H and delivered into the cask. If the cask is empty, it is simply filled with the fumes of the burning sulfur and closed up.

If a portion of the wine has been withdrawn from the cask, the sulfurous fumes are introduced through the open bung-hole until the air has been displaced, and the bung is then closed and the wine prevented from deterioration due to the presence of the air. No ash or other foreign substance can be introduced when the fumes are produced in this manner, and the wine can always be kept in perfect condition.

Hose and other pipes and conveyers are in very general use to transfer wine from one receptacle to another, and in spite of the greatest care the hose soon becomes foul or musty or filled with fungi if too long neglected; but by connecting with this apparatus and passing a stream of gas through the hose it can be entirely purified and kept sweet and in condition for further use.

J is a sliding gate which gives access to the screens for the purpose of cleaning them when necessary.

The peculiar form of grate adapted to support the sulfur strips on edge is particularly useful in this apparatus.

Having thus described my invention, what

I claim as new, and desire to secure by Letters Patent, is—

1. An apparatus for purifying wine casks and conveyers consisting of a furnace-chamber having a grate in the lower portion consisting of parallel bars standing on edge and adapted to receive and vaporize the sulfur-impregnated strips, which are ignited thereon, a plurality of screens of different mesh situated above the grate and adapted to arrest any ash or floating material, a propelling device connected with the side of the upper part of the case with a means for actuating the same, and a pipe connected therewith through which the fumes may be introduced into the cask or other receptacle.

2. In an apparatus for purifying wine casks, receptacles and conveyers, a conductor adapted to be connected therewith, and a fan or blast-forcing device, a closed chamber connected therewith, a furnace for the combustion of sulfur connected with said chamber, a plurality of screens fixed between the furnace and the chamber, and a grate within the furnace consisting of parallel bars standing vertically on edge so as to form supports for flat strips of sulfur-impregnated fibrous wicking which are placed on edge between them, and sustain them independently to allow a free ingress of air for combustion and to produce sulfurous fumes.

In witness whereof I have hereunto set my hand.

PETER J. NICOLINI.

Witnesses:
S. H. NOURSE,
JESSIE C. BRODIE.